J. M. EADS & A. S. BENT.
IRRIGATION VALVE.
APPLICATION FILED MAR. 20, 1909.
978,567.
Patented Dec. 13, 1910.
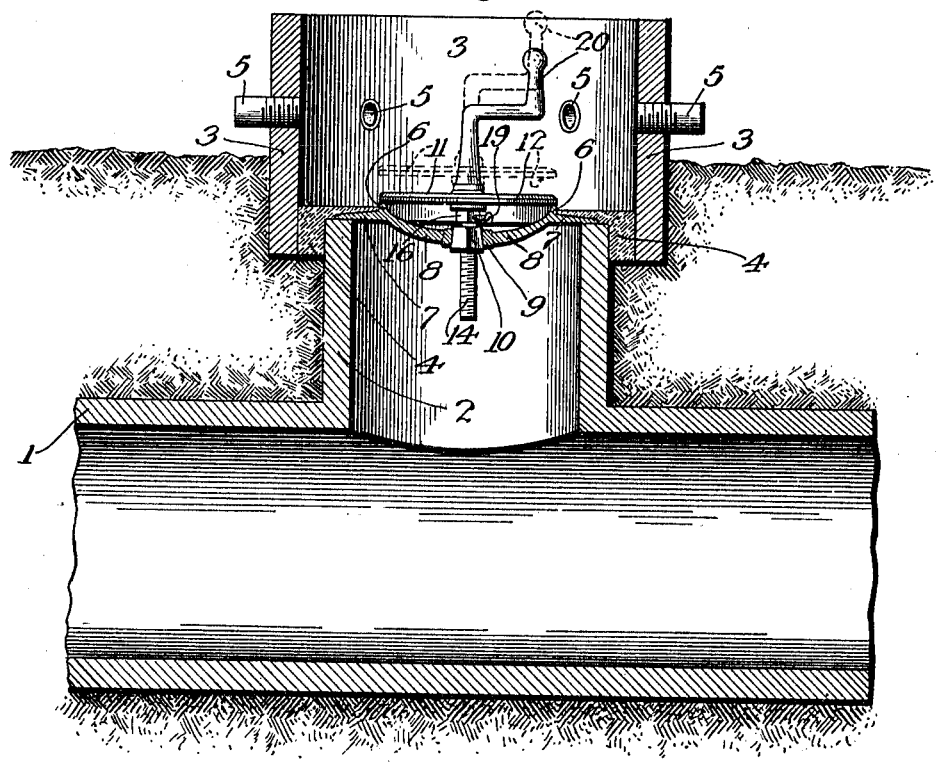
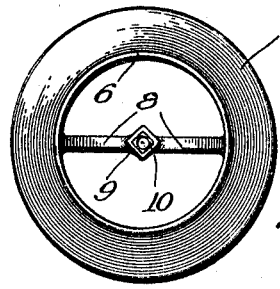
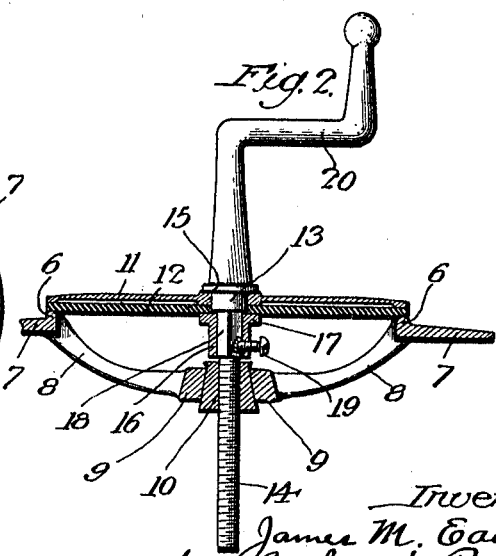
Witnesses:
Inventors
James M. Eads,
Arthur S. Bent.

UNITED STATES PATENT OFFICE.

JAMES M. EADS AND ARTHUR S. BENT, OF LOS ANGELES, CALIFORNIA.

IRRIGATION-VALVE.

978,567.  Specification of Letters Patent.  Patented Dec. 13, 1910.

Application filed March 20, 1909. Serial No. 484,645.

*To all whom it may concern:*

Be it known that we, JAMES M. EADS and ARTHUR S. BENT, both citizens of the United States, and residing at Los Angeles, in the county of Los Angeles and State of California, have invented a new and useful Irrigation-Valve, of which the following is a specification.

This invention relates to a valve designed for controlling the flow of water at a distributing outlet of an irrigation system, and has for its objects to provide a valve of this character which is of exceedingly simple and economical construction and durable and effective in use.

Further objects relate to details of construction which will be brought out in the following description.

Referring to the drawings: Figure 1 is a vertical section through a part of an irrigation system at one of the outlets showing the valve partially in elevation and in closed position. Fig. 2 is an enlarged sectional view of the valve. Fig. 3 is a plan view of the valve seat.

1 designates a pipe line with vertical branch 2 located in the ground, as shown, and 3 designates a basin which encircles the branch 2 and projects above the ground, as shown. Cement 4 is placed between the basin 3 and branch 2 to unite the same together. A series of discharge tubes 5 project radially from the basin 3, the water which is admitted to the basin 3 being discharged through the tubes 5 to the ground to be irrigated.

Resting upon the top of the branch pipe 2 is the valve which in the present form comprises a ring 6 forming a valve seat and having a flange 7 which rests upon the top of the branch pipe 2, the cement 4 extending over the flange 7 to secure the same securely in position. A yoke 8 extends across the ring 6 and is bowed downwardly, as shown in Fig. 1. The yoke 8 is cast integrally with the ring 6 and flange 7 and has a central enlargement 9 formed with a tapered, square orifice in which is inserted a square, tapered nut 10 formed of brass and headed at the top to secure it firmly in position. Being square the nut 10 is prevented from revolving in the yoke.

11 designates the valve disk below which is a gasket 12 of rubber or other suitable material which is adapted to close upon the valve seat 6 and prevent the passage of water therethrough. The valve disk 11 and gasket 12 are carried on the shank 13 of an adjusting screw 14, there being a shoulder 15 formed on the shank above the valve disk 11 which acts downwardly against the valve disk when the screw is tightened to close the valve. A square sleeve 16 having a round flange 17 is secured to a squared portion 18 of the screw 14 by means of a set screw 19 and the round flange 17 supports the gasket 12 and valve disk 11 when the screw is turned to open the valve. The sleeve 16 is adjusted to give sufficient space between ring 17 and the shoulder 15 to permit the screw to be freely rotated without turning the valve disk or gasket. The screw 14 takes into the non-revoluble nut 10 and the screw 14 is also preferably formed of brass so that rust is avoided, thereby insuring that the screw will always work easily in the nut 10. A crank 20 is formed on the upper end of the screw, by means of which the screw may be turned.

In Fig. 1 the valve is shown closed. To open the valve the crank 20 is turned to raise the screw in the nut 10 and elevate the valve disk 11 and gasket 12, and as the valve is thus opened the water, which is under pressure, rises through the ring 6 and, passing radially outward into the basin 3, rises therein until it reaches the discharge tubes 5, through which it then flows and is discharged to the ground. It is obvious that any desired size of opening may be made by regulating the screw and that the flow of water into the basin 3 may thus be controlled or restricted so that the delivery through the tubes 5 will be as desired. Dotted lines in Fig. 1 show the valve open to about the position which will permit as much water to enter the basin as can be discharged by the tubes 5.

From the foregoing it will be seen that the parts of the device may be easily taken apart and packed flatly for shipment. The gasket 12 being attached to the valve is always lifted with the valve.

What we claim is:

An irrigation valve comprising a ring forming a valve seat and having a flange cast integrally therewith, a downwardly bowed yoke extending across the ring and being cast integrally therewith, said yoke having a square, tapered orifice formed therein, a brass, square, tapered nut in the orifice in the yoke, the small end of the nut being headed over to secure it in position, an adjusting screw in said nut, said screw having a shoulder, a round portion below the shoulder and a square portion below said round portion, a valve disk below said shoulder, a gasket below the valve disk, said valve disk and said gasket being on said round portion of the screw, a square sleeve with a round flange below the gasket and supporting the same and being mounted on said squared portion of the adjusting screw, a set screw securing said sleeve to the squared portion, and a crank formed on the upper end of the screw.

In testimony whereof, we have hereunto set our hands at Los Angeles, California, this 13th day of March, 1909.

JAMES M. EADS.
ARTHUR S. BENT.

In presence of—
FRANK L. A. GRAHAM,
LOUIS W. GRATZ.